United States Patent
Smith et al.

(10) Patent No.: US 6,344,254 B1
(45) Date of Patent: Feb. 5, 2002

(54) MODIFIED SECONDARY BACKING FABRIC, METHOD FOR THE MANUFACTURE THEREOF AND CARPET CONTAINING THE SAME

(75) Inventors: Gregory B. Smith, Flinstone; Gregory D. Fowler, Resaca, both of GA (US)

(73) Assignees: Sind, LLC, Hanover Park, IL (US); Shaw Industries, Inc., Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/104,184

(22) Filed: Jun. 25, 1998

Related U.S. Application Data

(63) Continuation-in-part of application No. 08/898,667, filed on Jul. 22, 1997, now Pat. No. 6,060,145.

(51) Int. Cl.[7] ............................................. D05C 17/00

(52) U.S. Cl. ............................. 428/95; 428/96; 442/35

(58) Field of Search ...................... 428/95, 96; 442/35, 442/268, 270, 319

(56) References Cited

U.S. PATENT DOCUMENTS

| | | | |
|---|---|---|---|
| 3,497,414 A | 2/1970 | Blue ........................... | 161/67 |
| 3,510,386 A | 5/1970 | Goins et al. .................. | 161/66 |
| 3,535,192 A | 10/1970 | Gamble ........................ | 161/66 |
| 3,605,666 A | 9/1971 | Kimmel et al. ............. | 112/410 |
| 3,817,817 A | 6/1974 | Pickens et al. ............... | 161/67 |
| 3,834,978 A | 9/1974 | Nisenson et al. | |
| 3,839,136 A | 10/1974 | Eriksson ...................... | 161/80 |

(List continued on next page.)

OTHER PUBLICATIONS

Definition of "singeing," Fairchild's Dictionary of Textiles, 7th ed., Fairchild Publications, New York, p. 521, 1996.*

Carpet & Rugs; Copyright 1996; The Hoover Company; pp. 1–50.

Primary Examiner—Cheryl Juska
(74) Attorney, Agent, or Firm—Renner, Kenner, Greive, Bobak, Taylor & Weber

(57) ABSTRACT

A modified secondary backing fabric (20) for carpet (50) comprises a secondary backing scrim fabric (15) and a fiber batt (21) integrated with the secondary backing fabric forming the modified fabric, providing a soft face (51) opposite the face (52) presented by the scrim fabric, uninterrupted by the scrim fabric. A carpet (50) comprises a face yarn (11); a primary backing fabric (12), the face yarn being tufted into the primary backing fabric; a modified secondary backing fabric (20) attached to the primary backing fabric; and an adhesive material (14) binding the face yarn to the primary backing fabric and the primary backing fabric to the secondary backing fabric. The modified secondary backing fabric (20) comprises a secondary backing scrim fabric (15) and a fiber batt (12) integrated as a unitary scrim, providing a soft face (51) forming the underside of the carpet, the soft face forming a barrier uninterrupted by the scrim fabric and blocking exudation of any of the adhesive material from the underside of the carpet. A method for the manufacture of a modified secondary carpet backing (20) comprises selecting a secondary backing scrim fabric (15) and a fiber batt (21); joining the two fabrics to form the modified secondary carpet backing (20), providing a soft face (51) opposite the face (52) presented by the scrim fabric, uninterrupted by the scrim fabric; and subjecting the modified fabric to heat sufficient to remove substantially all loose fibers (45) projecting from the soft surface. The present invention also provides a method for the manufacture of carpet.

21 Claims, 9 Drawing Sheets

U.S. PATENT DOCUMENTS

| | | | |
|---|---|---|---|
| 3,849,223 A | 11/1974 | Kent | 156/148 |
| 3,922,454 A | 11/1975 | Roecker | 428/95 |
| 3,994,759 A * | 11/1976 | Stoller | 156/85 |
| 4,053,668 A | 10/1977 | Kimmel et al. | 428/95 |
| 4,069,361 A | 1/1978 | Kumar | 428/95 |
| 4,096,302 A | 6/1978 | Thibodeau et al. | 428/95 |
| 4,112,161 A | 9/1978 | Sorrells | 428/95 |
| 4,153,749 A | 5/1979 | Klein | 428/95 |
| 4,258,094 A | 3/1981 | Benedyk | |
| 4,305,986 A | 12/1981 | Hartmann et al. | 428/95 |
| 4,342,802 A | 8/1982 | Pickens | 428/92 |
| 4,522,857 A | 6/1985 | Higgins | 428/95 |
| 4,668,559 A * | 5/1987 | Mussallem, III | 428/167 |
| 4,702,950 A | 10/1987 | Slosberg et al. | 428/95 |
| 4,808,459 A | 2/1989 | Smith et al. | 428/95 |
| 4,822,658 A | 4/1989 | Pacione | 428/95 |
| 4,871,603 A | 10/1989 | Malone | 428/95 |
| 4,988,551 A | 1/1991 | Zegler | 428/40 |
| 5,024,840 A * | 6/1991 | Blakely et al. | 424/404 |
| 5,030,497 A | 7/1991 | Claessen | 428/95 |
| 5,104,712 A | 4/1992 | Walters | 428/95 |
| 5,204,155 A | 4/1993 | Bell et al. | 428/95 |
| 5,470,648 A | 11/1995 | Pearlman et al. | 428/247 |
| 5,540,968 A | 7/1996 | Higgins | 428/95 |
| 5,558,916 A | 9/1996 | Heim et al. | 428/95 |
| 5,578,357 A | 11/1996 | Fink | 428/95 |
| 5,604,009 A | 2/1997 | Long et al. | 428/95 |
| 5,612,113 A | 3/1997 | Irwin, Sr. | 428/95 |
| 5,616,200 A | 4/1997 | Hamilton et al. | 156/72 |

* cited by examiner

MODIFIED SECONDARY BACKING FABRIC, METHOD FOR THE MANUFACTURE THEREOF AND CARPET CONTAINING THE SAME

CROSS-REFERENCE TO RELATED APPLICATION

The present invention is a continuation-in-part of U.S. Ser. No. 08/898,667, filed Jul. 22, 1997 now U.S. Pat. No. 6,060,145 issued on May 9, 2000.

TECHNICAL FIELD

The present invention relates broadly to a modified secondary backing material or scrim fabric. This modified scrim is both novel and improved and is particularly suitable for carpet. More particularly, the present invention relates to carpet containing the improved scrim fabric and to the manufacture thereof. Carpet typically includes face fibers, in the form of tufts, primary and secondary backing members and latex or adhesives, or both, to bind the components together. A modified secondary backing member, or scrim, has been developed for such carpet which imparts useful properties to form novel, improved carpet. The present invention also provides a facile method for manufacturing such modified secondary backing members and its use in the manufacture of carpet.

BACKGROUND OF THE INVENTION

Tufted carpet is widely used today in the United States and abroad. Such carpet is produced by tufting machines which are essentially multi-needled sewing machines. The tufting machines push or, more specifically, sew the face yarns of the carpet (also referred to as pile yarns) through a primary backing fabric, forming loops in the face yarns. The machines also hold the face yarns in place while the needles are withdrawn. . The resulting loops formed by the face yarns are then either released to form loop-pile, tufted carpet, or cut to form cut-pile, tufted carpet.

A secondary backing fabric, attached to the backstitched side of the primary backing fabric, i. e. , the side opposite the protruding face yarns, is used to hold the tufted face yarn in place and is typically attached to the primary backing fabric by a latex or other binding adhesive applied to the backstitched side of the primary backing fabric. Although the combination of the secondary backing fabric and the adhesive binder combine to provide a necessary rigidity to the carpet, allowing it lay flat and resist buckling or travel under use, the back surface of the carpet becomes very rough, indeed abrasive.

Carpet is delivered to installation sites in rolls with the face yarns internal and in lengths from the loom which are usually 12 to 15 feet wide. Because the roll is heavy and somewhat unmanageable, it is frequently dragged around wall corners and through narrow hallways and doorways during which the rough carpet back surface causes damage to the room, house or building in which it is to become installed. Although there are carpets that have a soft backing, such as the foam backing utilized for indoor/outdoor carpet, better quality tufted carpet has typically been produced utilizing the secondary backing and adhesives as described hereinabove. Current tufted carpet production for the year 1997 in the U.S. alone is expected to reach over 4 billion square yards, up from 1.6 billion in 1994. Nevertheless, despite the damage that constantly results from the delivery and installation of carpet, little has been done to change the construction of tufted carpet.

A review of the patent literature over the last three decades, reveals many variations of carpet. U.S. Pat. No. 3,497,414, for instance, discloses a non-woven carpet and method for making the same. The non-woven carpet in the patent is produced by needling a fibrous batt of polyolefin fiber to partially compress and strengthen the batt and to create a smooth face and a pile face from which polyolefin fiber ends slightly protrude. The pile face of the batt is then heated to fuse the fiber ends to form balls on the ends of the fibers. A second batt is placed over the pile face and needled to the first batt. This combination may be employed alone as a carpet or as a carpet topping in combination with a backing which may comprise a needled foam-fiber batt laminate. The backing is preferably composed of polyolefin fiber and a layer of flexible polyurethane foam and is attached to the carpet topping by lamination.

U.S. Pat. No. 3,510,386 discloses the structure of an antistatic carpet that has a fibrous layer, an antistatic conductive coating, and a polymeric backing. The disclosed structure includes a fibrous pile extending upwardly from a primary backing that is initially backed with an antistatic layer. The polymeric backing layer holds the antistatic coating layer in place and may assist the antistatic coating layer in dispersing charges to the ground. The polymeric backing layer is preferably applied in the form of an aqueous dispersion of latex although other polymeric coatings such as polystyrene, vinylidene chloride, polyacrylates, butadiene styrene rubbers and the like may be employed. The patent also discloses that a secondary backing may be optionally applied to the polymeric backing.

U.S. Pat. No. 3,922,454 discloses a secondary backing for carpeting that comprises a woven synthetic scrim with a layer of staple fibers needled onto the top surface of the scrim with portions of the fibers projecting through to the bottom surface of the scrim. A latex coating is then applied to bond the fibers to the bottom surface of the scrim, and the bottom surface is then ironed. The secondary backing is connected to the back side of the primary backing by an adhesive layer. Once applied, the secondary backing provides a non-slip coating which enables the carpet to better frictionally engage the floor.

U.S. Pat. No. 4,112,161 discloses the structure of an indoor/outdoor tufted pile fabric that is intended to be a substantially permanent floor covering. The tufted pile fabric includes a synthetic plastic primary backing and a synthetic plastic secondary backing that are laminated together by a hot melt adhesive to form a relatively rigid impervious sheet. The structure is then provided with a plurality of perforations to give the fabric a softer hand and breathability. The patent intends for the fabric to be adhesively secured to a floor.

U.S. Pat. No. 4,153,749 discloses an antistatic carpet including a primary backing that carries the yarns. A secondary backing includes a base formed of jute or woven or non-woven polypropylene or polyester and a conductive polymeric layer that is bonded to the upper side of the base. The secondary backing is bonded to the primary backing by a conventional non-conductive latex coating layer.

U.S. Pat. No. 4,305,986 discloses a tufted carpeting composed of piled yarns that are anchored in a prime backing that may be either a bonded, non-woven fabric or a woven fabric. A secondary backing is a non-woven fabric composed of individual filaments that are randomly laid out such that they cross over and are bonded at their cross over points with the aid of applications of a secondary binder. The secondary backing is adhered to the primary backing by a rubber or PVC latex coating. The patent discloses that the purpose of the secondary backing is to provide not only better stability to the tufted carpet, but also to provide easy slidability on other surfaces.

U.S. Pat. No. 4,522,857, discloses a carpet tile consisting of a primary carpet base and a foam layer. The carpet base is laminated to the foam layer by an adhesive layer which is embedded with a layer of glass scrim to provide dimensional stability to the carpet tile. The foam layer consists of a fibrous carrier backing of woven polypropylene coated with a high density urethane foam having a tough integral skin surface on its underside. The patent discloses that the carrier backing can be woven or non-woven and composed of other materials such as nylon, polyester or fiberglass. The carrier backing contacts the adhesive that binds the foam layer to the primary carpet base.

U.S. Pat. No. 4,702,950, discloses a carpet tile having a primary backing sheet composed of non-woven polyester or ribbon polypropylene. The carpet tile includes a first precoat composition and a second precoat or intermediate coating composition that includes a limestone filler, a bitumen, petroleum resin and an ethylene vinyl acetate polymer. A second backing coating composition layer includes a bitumen with a thermoplastic rubber polymer material that is bound to a secondary backing sheet that includes a glass fiber scrim material bonded to a secondary backing sheet which forms the exposed back surface of the carpet. The secondary backing sheet may consist, for example, of a non-woven polyester sheet material. The second backing coating is hot melted onto the secondary backing sheet and the combination is laminated to the upper layers.

U.S. Pat. No. 4,871,603, is directed to a carpet tile with a cushioned backing. The backing material is described as being non-woven and is laminated to the carpet base by an adhesive layer, polyolefin, modified polyolefin, polyamide, or other suitable thermoplastic material, which is embedded with a layer of glass scrim to provide dimensional stability. The non-woven layer is about 3/16" to 1/4" in thickness and consists of substantially all synthetic fibers such as polyester, nylon and the like. The patent discloses that the synthetic fibers are held together in the layer by conventional methods of needle punching or air layering.

U.S. Pat. No. 4,988,551, discloses a carpet having a non-woven fleece fabric adhered to a secondary backing by embossing. The non-woven fleece fabric is embossed into a secondary backing that is conventionally attached onto a primary backing. The embossing roll contacts the non-woven fleece fabric and forms high and low areas. The bottom surface of the non-woven layer is then coated with a layer of pressure sensitive adhesive is used to releasably secure the floor covering to an underlying floor. The low areas extend into the secondary backing and serve to unitize the fleece fabric with the secondary backing.

U.S. Pat. No. 5,030,497, is directed to a carpet tile having a hot melt composition backing layer which has a secondary backing of a glass fiber tissue sheet material directly adjacent to a non-woven fibrous sheet material such as a polypropylene sheet material. The secondary backing includes a lightweight, glass fiber tissue sheet material and a spun, bonded polypropylene, non-woven sheet material bonded thereto. The patent discloses that the back surface of the non-woven sheet material is not saturated with any of the hot melt composition that holds the non-woven sheet layer to the glass fiber tissue sheet layer.

U.S. Pat. No. 5,104,712, discloses a surface covering material including an outer layer comprising a preformed fabric, an underlayer comprising a rigid, liquid impermeable sheet material bonded to the underside of the outerlayer by means of an adhesive bonding layer, and a lower layer of a relatively more flexible, hydrophobic closed cell foam that is bonded to the under surface of the under layer by hot melt adhesive or by sintering.

U.S. Pat. No. 5,204,155, discloses a floor covering, such as carpet or carpet tile which includes a primary backing layer composed of a fabric having a fibrous, tufted face and a fibrous back surface which is coated with a pre-coat layer, a first layer, a porous, non-woven glass fiber scrim sheet, a foam layer and a modified bitumen layer. A secondary backing layer includes a porous, glass fiber non-woven tissue sheet material that is directly bonded by the bitumen layer to a non-woven polyester or polypropylene secondary backing layer such that the bitumen layer does not extend through the secondary backing layer.

U.S. Pat. No. 5,470,648, relates to a composite fabric having two layers of non-woven fabric comprising entangled non-bonded nylon filaments and a reinforcing layer of fiberglass scrim adhesively attached to each of the non-woven layers. The composite fabric is useful as a backing in a carpet assembly. The patent discloses that the composite fabric is especially useful in environments where there are seasonal changes in humidity and temperature that cause carpets that are loosely laid to buckle. The non-woven nylon layers are attached to the fiberglass scrim by an adhesive applied to the surface of the scrim.

U.S. Pat. No. 5,540,968, discloses a cushioned backed carpet tile with stabilized non-woven backing. The backing material is preferably a needle punched non-woven material which has undergone a heat treatment to impart a smooth surface finish. The backing material comprises between about 30 percent and about 70 percent polypropylene and between about 70 percent and about 30 percent polyester. The thickness of the backing material can vary in the range from 0.03 inches to about 0.07 inches. A layer of polymer is puddled onto the backing material and doctored to a predetermined height with a blade. The primary carpet fabric is joined with a reinforcement material which is laid directly onto the layer of doctored polymer to laminate the layers.

U.S. Pat. No. 5,558,916, discloses a method for manufacturing a carpet having a secondary backing substantially impervious to liquids. The method involves applying a repellant finish onto the secondary backing material and drying the finish. The finish may be applied as a foam to the secondary backing material which is disclosed as being any of the known backing materials in the art, such as, jute, woven tapes of polypropylene, plain woven polypropylene fabrics, felts, and thermoplastic polymer films. The secondary backing is connected to the primary backing with any suitable adhesive polymeric latex.

U.S. Pat. No. 5,578,357 discloses a carpet having a primary backing with tufts of synthetic carpet fibers protruding from a top surface and, optionally, a secondary backing. The secondary backing is disclosed as being a woven-fiber or non-woven fiber construction. The secondary backing is fused to a sheet of isotactic polyolefin that is fused to the primary backing. The patent also discloses that the bottom layer of the carpet may be formed by a co-extruded layer of thermal plastic polyolefin elastomer fused to the bottom surface of an extruded sheet that is bound to the primary backing.

Finally, U.S. Pat. No. 5,604,009 discloses a non-adhesive bonded carpet comprising primary and secondary backing carpet backing made of non-woven fabrics. The face yarns are tufted into the primary non-woven and then the primary and secondary fabrics are combined without adhesive.

While the art is replete with examples of carpet tiles having a variety of backing materials, the manufacture of broadloom tufted carpet has remained relatively unchanged until the present invention.

SUMMARY OF INVENTION

It is, therefore, an object of the present invention to provide a modified secondary carpet backing that will increase the delamination strength and dimensional stability of the carpet.

It is another object of the present invention to provide a modified secondary carpet backing that provides a physical barrier which blocks the latex or other adhesive from exuding out the back of the carpet.

It is still another object of the present invention to provide a modified secondary carpet backing which provides a non-abrasive surface to minimize surface damage to the walls, baseboards, wood, floors of residential and commercial buildings, as well as physical injury to the installer.

It is yet another object of the present invention to provide a modified secondary carpet backing which improves the surface feel or "hand" of the finished carpet system.

It is a further object of the present invention to provide a modified secondary carpet backing which eases installation of carpet employing it by providing a surface with reduced friction, allowing both carpet and pad to slide together.

It is a further object of the present invention to provide a modified secondary carpet backing which functions to provide additional or sole padding to the carpet system.

It is yet another object of the present invention to provide a modified secondary carpet backing which can be employed as separate carpet padding.

It is a further object of the present invention to provide a broadwidth or modular carpet having greater flexibility which improves the installation process by providing a superior flexible carpet which enables the installers of such to bend, fold and manipulate the carpet around narrow passages as well as accommodate unusual floor layouts, thereby providing the potential for eliminating up to 33 percent of normal seaming required.

It is a further object of the present invention to provide a broadwidth or modular carpet providing a superior flexible carpet in which the flexibility coefficient is increased up to 20 percent at 40° F. over prior art and up to a 35 percent increase at 70° F. above prior art.

It is a further object of the present invention to provide a broadwidth or modular carpet providing a superior flexible carpet which lessens the installation time by up to 20 percent, henceforth providing a substantial cost savings during the installation process.

It is a further object of the present invention to provide a modified secondary carpet backing which functions to provide additional comfort under foot.

It is yet another object of the present invention to provide a modified secondary carpet backing which provides anti-microbial properties to carpet manufactured therewith.

It is yet another object of the present invention to provide a modified secondary carpet backing which provides anti-static properties to carpet manufactured therewith.

It is yet another object of the present invention to provide a broadwidth or modular carpet having anti-microbial properties.

It is yet another object of the present invention to provide a broadwidth or modular carpet having anti-static properties.

It is still a further object to provide a method for the manufacture of a modified secondary carpet backing for carpet which provides a soft backing surface.

It is still a further object to provide a method for the manufacture of carpet utilizing the modified secondary carpet of the present invention to provide a soft backing surface.

At least one or more of the foregoing objects, together with the advantages thereof over the known art relating to carpet and the manufacture thereof, which shall become apparent from the specification which follows, are accomplished by the invention as hereinafter described and claimed.

In general, the present invention provides a modified secondary backing fabric for carpet comprising a secondary backing scrim fabric and a fiber batt integrated with the secondary backing fabric forming the modified fabric, providing a soft face opposite the face presented by the scrim fabric, uninterrupted by the scrim fabric.

The present invention also includes a carpet comprising a face yarn; a primary backing fabric, the face yarn being tufted into the primary backing fabric; a modified secondary backing fabric attached to the primary backing fabric; an adhesive material binding the face yarn to the primary backing fabric and the primary backing fabric to the secondary backing fabric. The modified secondary backing fabric comprises a secondary backing scrim fabric and a fiber batt integrated as a unitary scrim, providing a soft face forming the underside of the carpet, the soft face forming a barrier uninterrupted by the scrim fabric and blocking exudation of any of the adhesive material from the underside of the carpet.

The present invention also provides a method for the manufacture of a modified secondary carpet backing scrim comprising selecting a secondary backing scrim fabric and a fiber batt; joining the two fabrics to form the modified secondary carpet backing scrim, providing a soft face opposite the face presented by the scrim fabric, uninterrupted by the scrim fabric; and subjecting the modified fabric to heat sufficient to remove substantially all loose fibers projecting from the soft surface.

The present invention also provides a method for the manufacture of carpet comprising providing face yarns in a primary backing fabric; providing a modified secondary carpet backing, formed from a secondary backing scrim fabric and a fiber batt, the modified backing providing a soft face opposite the face presented by the scrim fabric, uninterrupted by the scrim fabric; joining the modified backing to the primary backing fabric with an adhesive material; and heating the modified backing, primary backing fabric and adhesive material together at a temperature sufficient to bond the backings together and produce a carpet, having a soft face forming the underside of the carpet, the soft face forming a barrier uninterrupted by the secondary backing scrim fabric and blocking exudation of any of the adhesive material from the underside of the carpet.

PREFERRED EMBODIMENT FOR CARRYING OUT THE INVENTION

Figure 1:
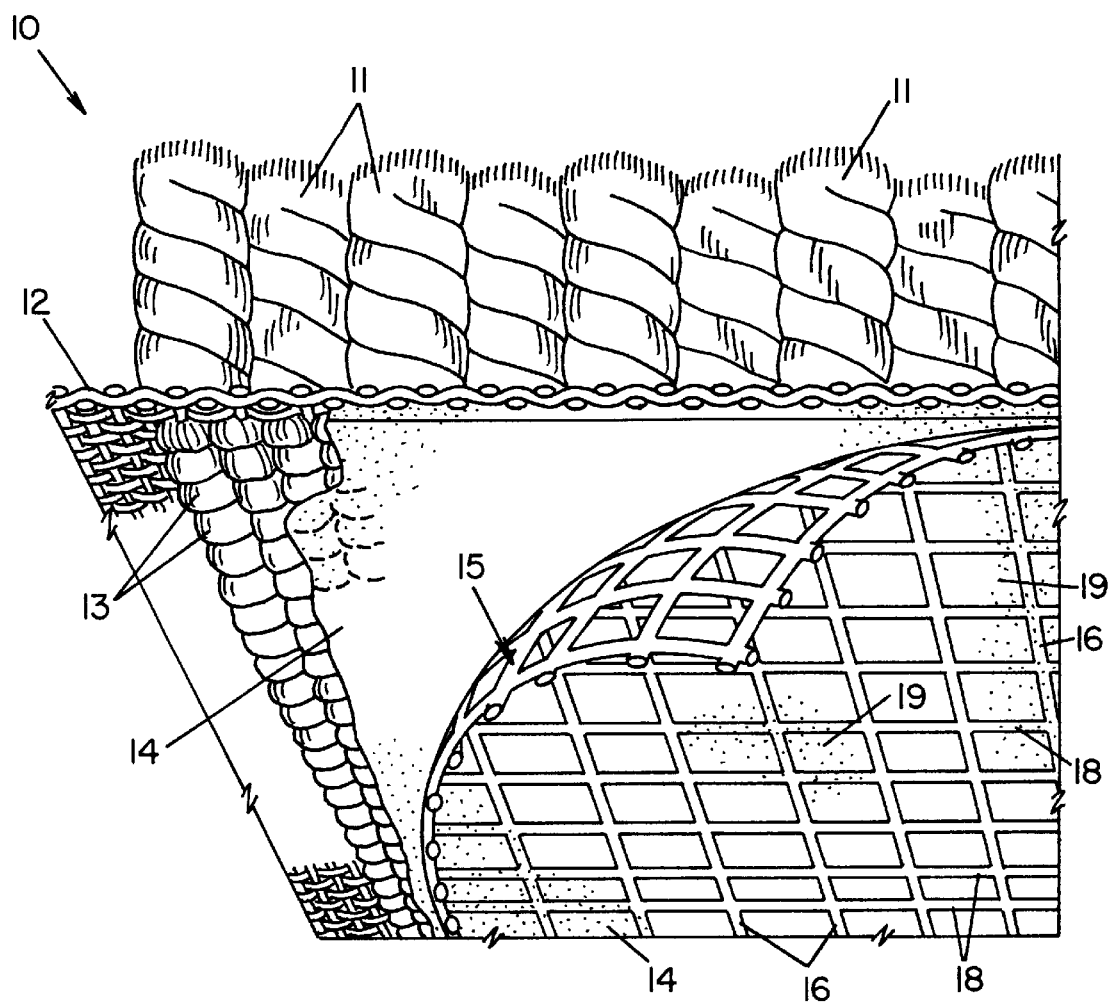
FIG. 1 is an isometric view of a section of tufted carpet according to the prior art showing various layers of the construction.

Known carpet construction is apparent from the section depicted in FIG. 1, where several of the layers have been peeled back to reveal the components. As used herein, the term "carpet" shall refer inclusively to all forms of tufted, woven and needled types of carpet, because practice of the present invention is not based upon the type of carpet, but rather the use of a modified scrim fabric, in lieu of the conventional secondary scrim or carpet backing, as will be explained hereinafter.

A typical carpet, denoted generally by the numeral 10 in the drawing, includes a plurality of face yarns 11 typically are tufted, woven or needle punched into and through a primary backing fabric 12, providing loops 13 which are locked into the primary backing. These, in turn, are more securely held in place by a conventional latex or binding adhesive 14.

The most common method for the finishing of a carpet 10 is to laminate a woven polypropylene secondary backing or scrim 15 to the primary fabric 12 by the use of latex 14. It is bonded to the primary backing by virtue of the adhesive layer 14 and separate adhesives, applied to the scrim. The adhesive binder(s) surround the warp and fill yarns, 16 and 18 respectively, of the scrim and occupy a portion of the interstitial areas 19, formed by the warp and fill yarns and often encapsulate the yarns. After the binder materials harden or set, a rough, abrasive surface is produced by the filler added to the binder which is often ground marble, inherently abrasive.

This lamination step is an important part of making a carpet more stable, moisture resistant, shrink-proof and non-raveling. Most obvious is the fact that without some sort of lamination step, the tufts or face of the carpet could be easily pulled from the carpet. In addition to the mechanical features this lamination step also helps aesthetically by improving thickness or bulk and gives a more pleasing, consistent appearance and feel.

The lamination of a woven polypropylene secondary carpet backing is achieved in a multi-step process utilizing an oven which is often in excess of 200 feet long. First, the back of a carpet is coated with approximately 22 to 28 ounces/yd of latex and the application is smoothed with a "doctor blade". This doctor blade is needed to force the latex into the tufted yarn to secure the yarn in the primary backing. Happening simultaneously is the second part of the multi step process, coating the secondary backing. This coating is usually much lighter than the carpet application, approximately 4 to 10 oz/yd. The third step is the "marrying" of these two pieces into one unit. The secondary backing must be positioned carefully so that the edges match the tufted product and then the two are pulled through a pressured roll (called a marriage roller) to laminate or stick them together. The carpet is then processed through an oven approximately 300° F. to dry or "cure" the latex. The finished carpet is then cooled and rolled before storing for final shipment to the customer.

The face yarns 11 of the carpet 10 may be made from any material known in the art suitable for use as face yarns and are preferably made from polymers selected from the group consisting of polyolefins; polyamides; polyesters, polyethylene terephthalate (PET) and polytrimethylene terephthalate (PTT), and mixtures thereof. Most preferred are polypropylene, polyester and nylon. Of course, practice of the present invention is not limited to the selection of any specific type of fiber for the face yarn and this includes the use of natural fibers.

The face yarns 11 may be prepared by any conventional means known in the art. Preferably, conventional equipment and methods are employed to make spun yarns or bulked continuous filament yarns comprising a plurality of polymeric fibers produced by conventional extrusion methods with conventional equipment. The term face yarns is thus intended to include all forms of yarn that can be employed to manufacture carpet whether spun yarn, bulk continuous filament yarn or other forms of yarn.

The primary backing fabric 12 may be produced using industry accepted methods. Typically, the primary backing fabric 12, as well as the secondary backing fabric 15, are made from polyamides and polyolefins, particularly polypropylene. As is known, primary and second backing fabrics are prepared from fibers, typically synthetic fibers, which have come to replace natural or staple fibers. Nevertheless, fibrous components can be derived from natural fibers as well as synthetic and synthetic materials can be derived from virgin as well as recycled materials and thus, practice of the present invention is intended to include all forms of fibers in the manufacture (weaving) of primary and secondary backing fabrics and selection thereof is not critical to practice.

With respect to the adhesive binders, typical materials utilized include styrene-butadiene rubbers (SBR's), PVC, EVA, polyesters, polyurethanes, polyolefins, emulsified polymers and the like. Accordingly, practice of the present invention includes all known face yarns and backing materials, as well as adhesive binders, none of which constitute a limitation to the practice. Moreover, other methods for joining the primary and secondary backing members together include extrusion coating, melt blown, thermal bonding including ultrasonic, infrared, microwave, radio frequency and the like.

Figure 3:
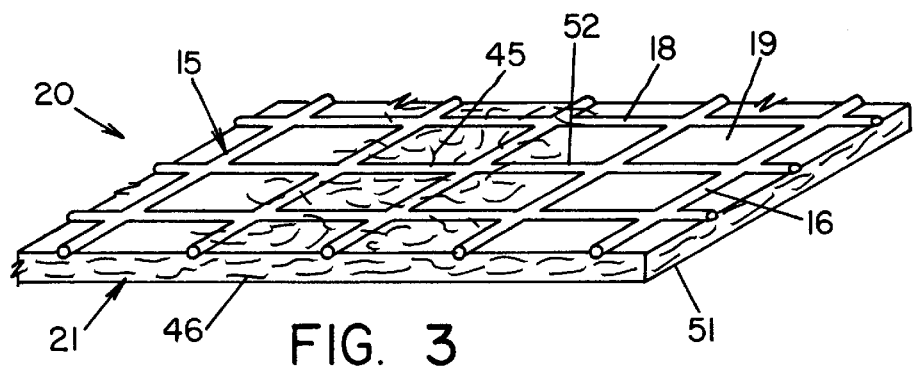
FIG. 3 is a side elevation of a section of modified secondary carpet backing scrim of the present invention.

As noted hereinabove, a modified secondary carpet backing material, indicated generally by the numeral 20 in FIG. 3, is provided by the present invention. The modified secondary backing comprises a novel, integrated scrim formed by joining a conventional woven secondary backing fabric 15, with a layer of fiber batt 21 or nonwoven material (fabric) prepared from fiber batt. Notwithstanding the reference to conventional woven secondary backing fabric, it is to be appreciated that practice of the present invention is not limited to any particular type of secondary fabric because woven, knitted, point bonded, thermal fused with use of low melted fibers and other processes can be employed to manufacture a suitable modified secondary backing.

As is known, fiber batts and nonwovens can be manufactured from fibers, including natural fibers as well as synthetic and synthetic materials can be derived from virgin as well as recycled materials. Regarding natural fibers, cotton may be particularly useful although other staple fibers are not to be precluded. As for synthetic fibers, the polyolefins are preferred, particularly polypropylene. Synthetic fibers are advantageous because of their physical and chemical properties and also because both virgin and recycled materials can by employed and thus, practice of the present invention is intended to include all forms of fibers in the manufacture of fiber batts and nonwovens and selection thereof is not critical to practice.

In the manufacture of the nonwoven material, it is also possible to employ fibers that have been treated or manufacture with separate properties such as anti-microbial and anti-static, further enhancing the utility of the modified secondary carpet backing and carpet manufactured therewith. A product having anti-microbial properties would be useful in "clean" environments such as hospitals, food handling/processing areas, health clubs, locker rooms and the like. Similarly, products having ant-static properties would be useful in the electronics industry where control over static electricity is vital. Thus, although the following description of the modified secondary carpet backing of the present invention is exemplified by the use of polypropylene fibers for the nonwoven, it is to be understood that fibers having additional chemical properties could be readily employed.

Nonwovens are produced by many different processes, but all have three general steps in common; web forming, web bonding and fabric finishing. By utilizing variations of each of these steps, a nonwoven fabric can be customized to many different applications in textile and industrial use. The following description is a generalization of each of the steps used in producing a nonwoven and is not meant to include all possible variations.

Web forming can be divided into three distinct methods; wet laid, dry laid and direct laid. The wet laid process is very much like papermaking. It manipulates short fibers through a water solution onto a screen where the water is removed and a sheet, or web, is formed. The web generally has some sort of chemical applied as a binder before going on to the next process. The dry laid method is also known as carding. Carding is a process that arranges the fibers into parallel arrays by using rotating drums covered with fine wires and teeth. Due to the relatively light web thickness, some sort of web layering (cross-lapping) is usually employed in a carded nonwoven. The direct laid method can be classified as either spunbond or meltblown. In spunbond the fibers are formed by forcing molten polymer out of tiny holes and depositing the filaments onto a moving belt which forms the web. The filaments are stuck together at the crossover points created by movement of the extrusion spinerette and air flow. In meltblown the molten polymer is blown with hot air at the spinerette face causing the filaments to fracture into tiny fibers. These fibers are blown onto a screen where they bond to each other on cooling to form a web.

A fourth means of web forming includes flocking which is a method of cloth ornamentation in which adhesive is printed or coated on a fabric and finely chopped fibers are applied all over by various means, such as dusting, airblasting or electrostatic attraction. In flock printing, the fibers adhere only to the printed areas and are removed from the unprinted areas by mechanical action. This technique could be employed to form webs useful for joining with secondary fabric, as will be discussed hereinbelow.

Web bonding can be accomplished by chemical bonding, mechanical bonding or thermal bonding. Chemical bonding is simply using latex or in some cases a solvent, to stick the formed web together. Other chemicals are also known for web bonding and can be utilized for practice of the present invention. Often times coloring or printing is also accomplished in this step. Mechanical bonding can be either needlepunching, hydroentangling or stitchbonding. Needlepunching consists of forcing barbed needles vertically through the formed web and entangling the fibers as the needles pass multiple times through the web. In this process the type of barbed needle and the speeds of the needle and fabric are critical to the bonding performance. Hydroentangling utilizes high speed water jets to accomplish the bonding of the fiber web. These spurts of high pressure water are patterned through a perforated cylinder to allow an aesthetically pleasing appearance. Stitchbonding uses a continuous filament sewn into the formed web to hold the fabric together. Thermal bonding can be accomplished by forcing hot air through the formed web or by transferring the formed web through a heated, embossed set of rolls. In either method the bonding is aided by having low melt temperature fibers in the web, or by applying low melt additives (powder or granules) to the web prior to the heating stage.

Fabric finishing is determined by the properties required for the end use of the fabric. If a softer, bulkier fabric is desired, creeping and embossing are used to change the texture and feel of the nonwoven fabric to meet the needs of the end use. In order to form fabrics with complex properties, laminating is used. For example, two softer, weaker fabrics can "sandwich" a stronger fabric in order to get a strong fabric with softness. Some of the other properties that are achieved in the finishing process are breathability, repellency, porosity, absorbency, improved hand and combinations thereof.

In a preferred embodiment, the fiber batt 21 is a carded web crosslaid needlepunched material comprising polypropylene fiber. Where polypropylene fiber is utilized, about 4 denier per filament by 4 inch length fibers are preferred, with the fiber weight ranging from about 0.5 to about 40 ounces per square yard, and with about 1.75 to 2.25 ounces per square yard being most preferred. The heavier weights of fiber batt will provide for added comfort padding, greater sound adsorption and greater insulative properties.

Figure 2:
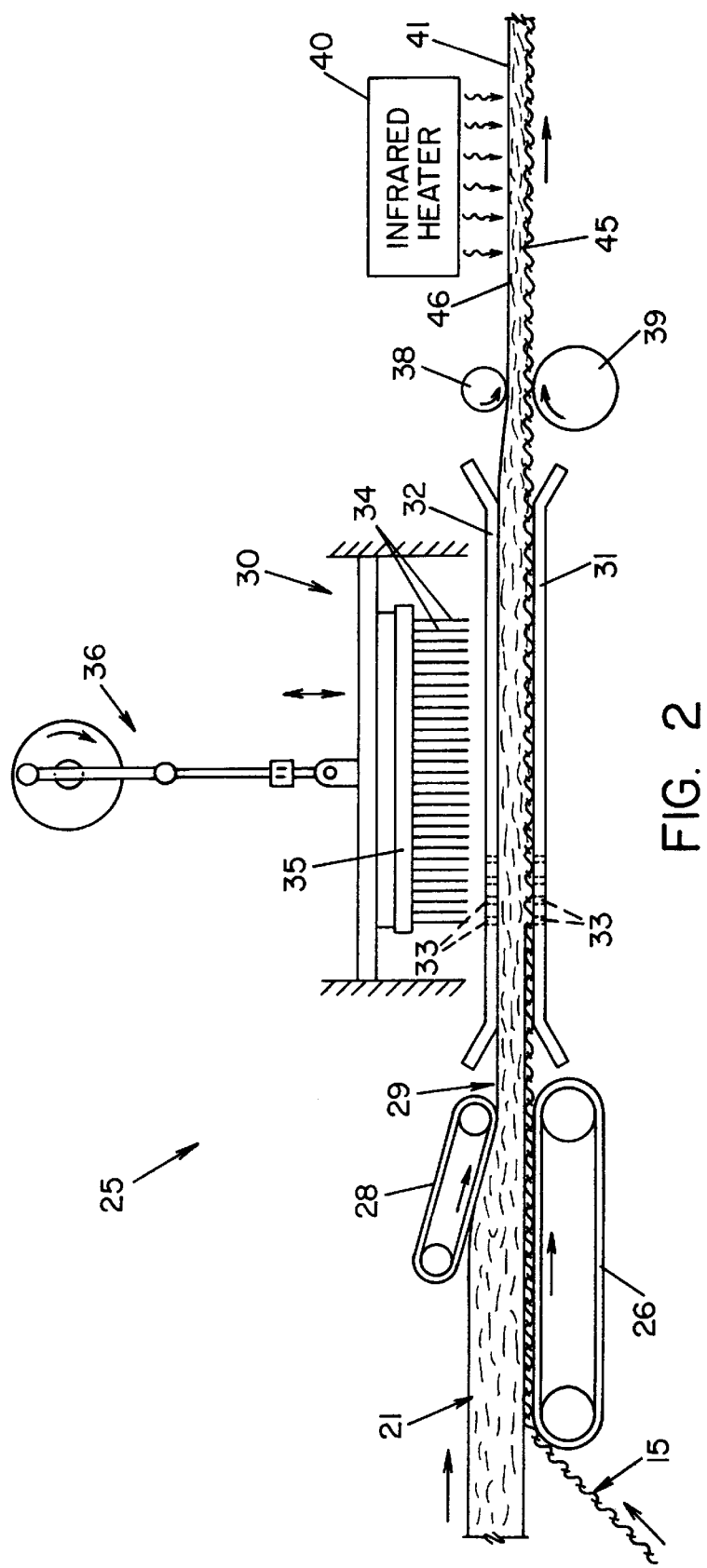
FIG. 2 is a schematic side elevation of apparatus utilized for the manufacture of modified secondary carpet backing scrim of the present invention.

The fiber batt 21 is joined with the secondary backing fabric 15 by mechanical bonding, particularly by needlepunching. With reference to FIG. 2, a segment of apparatus, generally 25, for such mechanical bonding is depicted schematically. A continuous layer of secondary backing 15 is delivered over a moving belt 26 where it is joined from above by a fiber batt 21. A roller mechanism 28 is juxtaposed over the moving fiber batt to compress the several individual layers comprising the fiber batt, as at 29. Next the two contiguous components are feed into the needle loom, generally 30. As they enter the loom, the fiber batt 21 rides on top of the secondary fabric 15 and is further compressed between two plates, bed and stripper, 31 and 32 respectively, where actual needling occurs. The two plates are mirror images of each other and contain small holes 33 for penetration by the needles.

Needle looms, when used with fibrous materials, such as the individual layers of fiber batt, drive barbed needles through the fibers to provide entanglement. However, for the present invention, the barbed needles carry fibers from the fiber batt 21, through the secondary scrim 15, to provide lamination between the two. While there are many configurations of needle loom, the preferred loom for manufacture of the modified scrim 20, uses single downpunch technology. This means that the needles 34 carried by the needle board 35 are driven by a reciprocating mechanism 36 to penetrate the fabrics from the top down, or through the fibers of the fiber batt into the scrim. Other needle looms, provide both top and bottom penetration and/or multiple needle boards in series within the same loom.

The single needleboard has a needle density of about 75 to 150 needles per inch of working width. In typical use, the throughput speed of a needlepunch line would be about 20–25 feet per minute with the needleboards needling at approximately 600 to 1200 strokes per minute yielding 350 to 450 needle penetrations per square inch (PPSI) with an advance of about 0.31 inches per stroke. The inches of advance per stroke are dependent on the needles per inch of working width, or needle density. A stretching or elongation of 4–8 percent is required in the needle loom to provide correct tension during needling. It is believed that the invention is best served by providing approximately 400 PPSI in order to provide the desired dimensional stability, adhesive blocking ability, aesthetics desired (softness, evenness), locking of fibers to prevent shedding, lamination of the secondary scrim and fibers, and padding effect. Significant changes in the PPSI would increase some of the listed effects while sacrificing the others (i. e. , increased PPSI would increase the locking of fibers to prevent shedding, but would decrease the padding effect).

The needles used in the standard needlepunching process may be of any type (e. g. , barbed) suitable for integrating the fiber to a secondary backing fabrics, but the preferred needles are the standard Foster type, triangular blade needles 15×18×36×3 RBA or their equivalent. These needles consist of a triangular shaped shaft, 6 barbs (2 on each apex), a 0.0003' barb depth, a 20° barb angle, RBA barb spacing and a 3.5 inch length. These needles penetrate the secondary fabric and fiber batt to a to a depth of about 12 mm. This depth is defined as the distance the needle point penetrates the bottom (bed) plate. With the above mentioned needle, this depth is preferred and is believed to provide maximum integration of fibers from the fiber batt to the secondary fabric.

The needles must penetrate through the fiber first and then into the scrim. A reversal of the needling direction would not yield an equal product. A deeper penetration depth would adversely effect desired characteristics such as fabric evenness (aesthetics) and the padding effect in final carpet product. A lesser penetration would not achieve sufficient mechanical bonding between the fibers and the scrim. During the needling process it is important that approximately 70 percent of the fibers stay on one side of the scrim, referred to as the needle side or top side, which is the side that will ultimately contact the floor. The remaining 30 percent of fibers to be directed toward the latex binder, allows the scrim to have intimate contact with the binder during carpet manufacture; therefore increasing lamination strength and adding stability to the carpet.

While the foregoing ratio of fibers residing on the floor side of the modified scrim 20 is greater than on the latex side for most forms of carpet, there are instances where it may be useful to have other ratios, approaching equal amounts or where the floor side is lower than the adhesive side. In the manufacture of carpet tiles, as an example, a greater concentration of fibers e. g. , 70 percent on the latex side, will provide improved products over existing carpet tiles which do not employ the modified scrim of the present invention.

Returning to the manufacture of the modified scrim, it will be appreciated, that the above-specified operation is only a preferred procedure for attaching the secondary backing fabric to the fiber batt 21. Moreover, with respect to the needlepunching process described hereinabove, it will be appreciated that alternative operations of the needle loom can be used. For instance, slower throughput speeds and a reduction of strokes per minute of the needleboards will still enable the needle loom to provide the necessary amount of punches per square inch through the fiber batt and secondary backing fabrics.

After passing through the needle loom 30, the resulting joined, entangled fabrics are pulled from the loom by opposed driven rolls 38, 39, for passage through an infrared heater 40. The infrared heater is employed to fuse the errant fibers appending upwardly from the surface 41 of the modified scrim, originating from the fiber batt which is now integrated with the scrim. This fusing of the protruding fibers serves to prohibit the same from breaking loose in further processing and to enhance the adhesive blocking feature of the product while providing a slick surface which eases installation. During subsequent manufacture of the carpet, the modified scrim 20 is bonded to the primary backing 12 and tufted yarn loops 13 with an adhesive. Fusing of the extraneous fibers eliminates any unwanted formations of masses comprising loose fibers and adhesive from forming and depositing in the otherwise smooth application of the layers in the final stages of carpet manufacture.

The heating step in conducted at a temperature sufficient to melt the extraneous, protruding fibers without melting fibers in the body of the fabric. The temperature needed would depend upon the polymer employed, with polypropylene, temperatures ranging from 138° C. to 171° C. Residence time within the heating area ranges from about 6 to 15 seconds. These parameters of heat and time are dependent on the distance the heat source is from the fabric surface. In a practice the fabric has been placed approximately 4 inches from the fabric surface and infrared heat is applied only to the side of the fabric which does not have the exposed secondary scrim.

Figure 5:
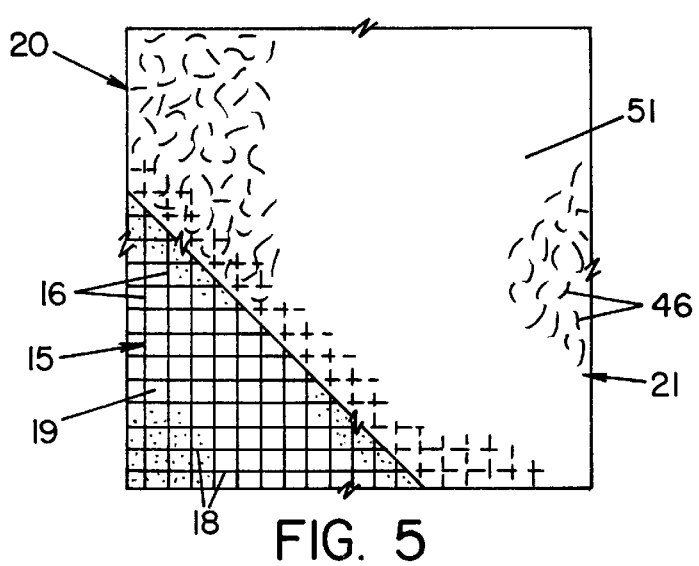
FIG. 5 is a bottom plan elevation of the modified secondary carpet backing scrim depicted in FIG. 3.

With reference to FIGS. 3 and 5, it is apparent that a portion of the fibers 45 from the fiber batt 21 penetrate and are entangled with the secondary scrim 15. At the opposite side of the batt 21, the remaining fibers 46 engage the floor surface. The joining of the fiber batt and the secondary scrim imparts physical properties that neither a nonwoven fabric i. e. , a fiber batt needled into a fabric without secondary scrim, nor a secondary scrim product can do alone. Further, a simple layering of the two fabrics or otherwise joining of the two in a manner that does not provide an integrated product cannot duplicate the desired physicals. These facts are supported by the values reported in Table I hereinbelow.

TABLE I

COMPARISON OF PHYSICAL PROPERTIES

| | WEIGHT (OZ/YD$^2$) | SHRINK (%) WARP × FILL | TENSILE LBS. WARP × FILL | ELONGATION % WARP × FILL | AIRFLOW (CUBIC FEET/MIN) | APPARENT OPENING SIZE | WATER FLOW (GALLONS/MIN) | STIFFNESS INCH – LBS |
|---|---|---|---|---|---|---|---|---|
| Modified Scrim | 4.3 | 1.7 × 1.1 | 52 × 72 | 18 × 36 | 456 | 100 | 178 | 50.37 |
| Scrim Fabric | 2.0 | 3.3 × 4.9 | 78 × 31 | 23 × 34 | 1242 | open | N/A | 6.53 |
| Nonwoven Fabric | 2.3 | 2.4 × 0.4 | 65 × 100 | 60 × 55 | 312 | 140 | 202.9 | 20.58 |

The values reported in Table I were determined, as follows.
1. Mass per Unit Area—ASTM D-5261—The mass per unit area of a fabric is determined by weighing test specimens of known dimensions, cut from various locations over the full width of the laboratory sample. The calculated values are then averaged to obtain the mean mass per unit area of the given fabric. Mass is expressed in ounces per square yard.
2. Fabric Shrink—ASTM D-2646—A measured specimen is taken from a laboratory sample and exposed to dry heat for a prescribed time, cooled and re-measured to determine dimensional change. Shrinkage is expressed as % change.
3. Grab Tensile & Elongation—ASTM D-4632—A continually increasing load is applied longitudinally to a specimen and the test is carried to rupture. Values for the breaking load and elongation of the test specimen are obtained from the machine dials or interfaced computers. The obtained values are then averaged to obtain the breaking load and elongation of the given fabric. Tensile is expressed in pounds of applied force and elongation is expressed as a percent.
4. Air Permeability—ASTM D-737—The rate of air flow through a known area of fabric is adjusted to secure a prescribed pressure differential between the two fabric surfaces in the test area and from this rate of flow the air permeability of the fabric is determined. Air permeability is expressed as air flow per cubic feet per minute.
5. Apparent Opening Size—ASTM D-4751—A fabric specimen is placed in a sieve frame, and sized glass beads are placed on the fabric surface. The fabric and frame are shaken laterally so that the jarring motion will induce the beads to pass through the test specimen. The procedure is repeated on the same specimen with various size glass beads until its apparent opening size has been determined. Openings are expressed as a U.S. Sieve Size or millimeter opening size.
6. Water Permeability—ASTM D-4991—A head of 50 mm (2 in.) of water is maintained on the fabric specimen throughout the test. The quantity of flow is measured versus time. The rate of flow of the water under a differential pressure through the fabric is measured. Water permeability is expressed as gallons per minute per feet squared.
7. Stiffness—ASTM D-1388—A strip of fabric is slid in a direction parallel to its long dimension, so that its end projects from the edge of a horizontal surface. The length of overhang is measured when the tip of the test specimen is depressed under its own weight to the point where the line joining the tip to the edge of the platform makes an angle of 41.5 degrees with the horizontal. One half of this length is the bending length of the specimen. The cube of this quantity multiplied by the weight per unit area of the fabric is the flexural rigidity. Stiffness is expressed in inch-pounds.

By integrating the secondary scrim 15 and fiber batt 21 into one, i. e., the modified scrim 20 of the present invention, a synergistic effect is obtained which cannot be achieved by either a scrim fabric or a nonwoven fabric of the prior art, or by layering together these two components. The shrink, elongation, and stiffness properties of the modified scrim according to the present invention are all superior while the air flow, opening size and other characteristics are in a range that are not detrimental to the end product. Lower shrink and elongation prevent the modified scrim fabric from shrinking or distorting while going through the carpet finishing process, while the more rigid fabric 20 allows for easier handling during processing. The unique properties of the integrated scrim 20 allow the use of standard carpet manufacturing equipment currently in practice, while creating a novel carpet product. Unexpectedly, although the integrated scrim fabric 20 is rigid, a softer, more flexible carpet is produced by the use of the fabric 20.

The particular physical properties of the modified scrim depend somewhat upon the physicals of the secondary scrim 15 and fiber batt 21 selected, however, as can be seen from the data reported in Table I, the physicals are generally improved over the combination of the two components individually.

Photomicrograph examination of carpet produced utilizing the modified scrim 20 of the present invention reveals the unique meshing of face fibers from the carpet with the filaments needled into the scrim 20 from the fiber batt and that both become entangled together during adhesive bonding of the components. The end result is a superior composite product with increased delamination strength of up to 141 percent over conventional leno weave secondary backings. Additionally, it can be observed that the surface area available for bonding purposes is increased up to 300 percent on account of the introduction of filaments 45 needled into the secondary backing fabric 15.

As an example of the manufacture of a modified scrim within the scope of the present invention, a secondary scrim fabric comprising a 16 ends/inch warp direction by 5 picks/inch weft direction leno weave fabric was selected as the scrim or substrate fabric 15. This scrim fabric was placed on an apron, e. g., transport device 26 and a web or batt of nonwoven fibers was laid on top of the fabric 15. Weight of the nonwoven selected was 2–3 oz/yd$^2$. The fiber web and scrim fabric were needled together in the needle loom 30, with needle penetration depth and punches/in$^2$ being critical parameters. The resulting fabric was then held to a specified width by a tenter frame while going through a series of heaters 40, to provide the desired surface characteristics, as explained hereinabove. The finished modified scrim fabric 20 was then rolled onto a core to a specified length determined by the carpet manufacturer.

Although the scrim fabric 15 exemplified comprised 16 ends per inch (warp) by 5 picks per inch (weft), this does not constitute any limitation to practice of the invention, as less than 5 picks per inch could be utilized as well as greater than 5 picks per inch. Also, while the fabric 15 was a leno weave, any weave type can be used e. g. , plain, satin, twill, as may be desired to manufacture a secondary carpet backing, presently or in the future. What is important to practice of the invention is that the scrim fabric and fiber batt become integrated to form the modified scrim 20.

The specific amount of needling is necessary to provide adequate air flow and moisture exhaustion during the coating/lamination process as well as provide a thermal barrier from the same heat source as used during the coating/lamination process. The face yarns, primary backing and secondary backing are all heat sensitive and therefore subject to reorientation of molecular structure during extreme heat exposure. The use of a modified scrim backing, according to the present invention, is designed to absorb heat at a controlled level to prevent the reorientation of molecules in the carpet components. The overall effect of such reorientation of molecules results in carpeting which is 20–25 percent more rigid or less flexible than carpets made with the modified scrim 20 of the present invention. This thermal barrier also provides for lower face and composite temperatures of 75° F. to 125° F. and results in less shrinkage of the fiber components, which results in higher face values, increased cushion under foot as will be discussed with respect to the drawings FIGS. 12A–B, 13A–b, hereinbelow.

Figure 4:
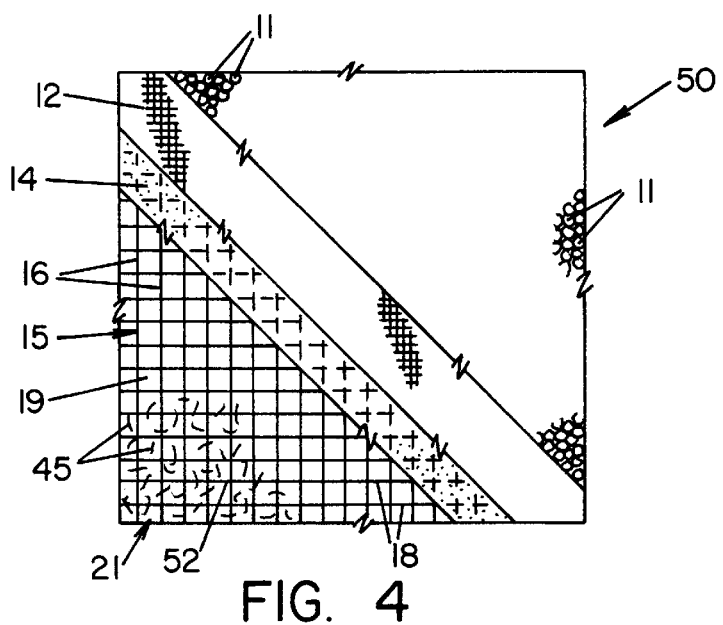
FIG. 4 is a fragmentary top plan with a progressive break presenting the various layers in a tufted carpet according to the present invention as depicted in FIG. 6.
Figure 6:
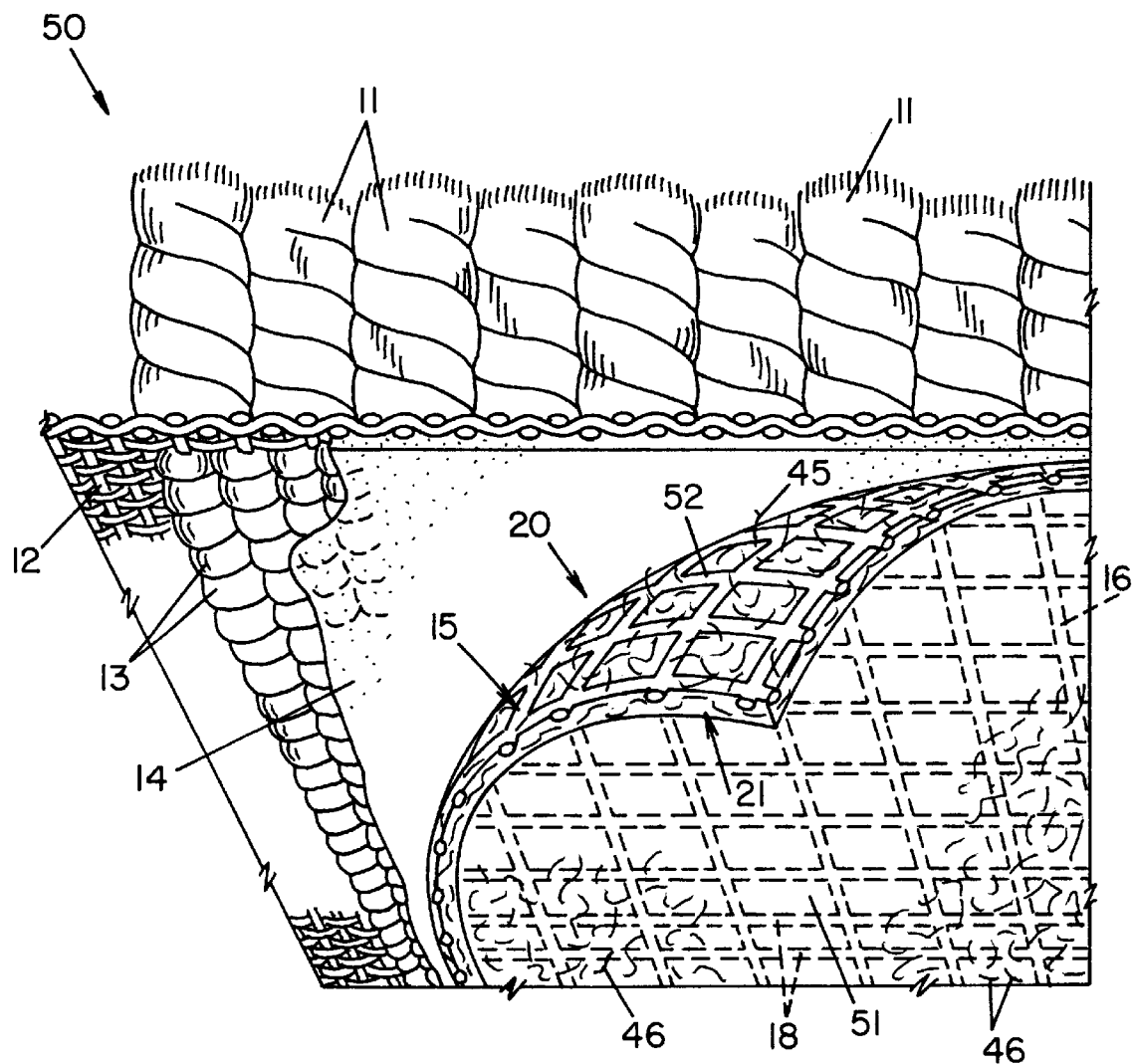
FIG. 6 is an isometric view of a section of tufted carpet utilizing the modified secondary carpet backing scrim of the present invention, showing various layers of the construction.

In FIGS. 4 and 6, carpet according to the present invention is indicated generally by the numeral 50. It includes a plurality of face yarns 11 are tufted, woven or needle punched into and through the primary backing fabric 12, providing loops 13 which are locked into the primary backing. A conventional latex or binding adhesive 14 is employed as before, which also laminates the modified scrim 20 of the present invention to the primary backing fabric. With the notable exception of the modified scrim 20, the construction of carpet 50 is otherwise the same as that of carpet 10. Thus, the various parameters for carpet manufacture which may differ depending upon the type of carpet being produced and the equipment utilized, such as speeds, temperatures and the like, remain essentially the same where the modified scrim 20 of the invention is employed. Inasmuch as these are generally known to those skilled in the art of carpet manufacturing, they do not constitute a limitation to practice of the method and have not been set forth herein.

Flexibility of the carpet 50 is improved by use of the modified scrim 20 of the present invention to a degree that the flexibility coefficient for the carpet is improved up to about 20 percent, at 40° F. and up to about 30 percent, at 70° F. over carpet 10 of the prior art. The greater flexibility also lessens the installation time by up to about 20 percent over conventional carpet. As noted above, the greater flexibility imparted to the carpet 50 is totally unexpected given the rigidity of the scrim 20. Another advantage imparted to the carpet 50 by virtue of utilizing the modified scrim 20 is that the R value of the carpet is increased.

As a result of the utilizing the modified scrim 20 of the present invention in the manufacture of carpet, delamination strength between the primary backing and modified scrim is significantly improved over current carpet in which primary and secondary backing fabrics are laminated together with the use of the adhesive or latex binder. In order to appreciate this distinction, reference should be made to FIGS. 7 and 8.

Figure 7:
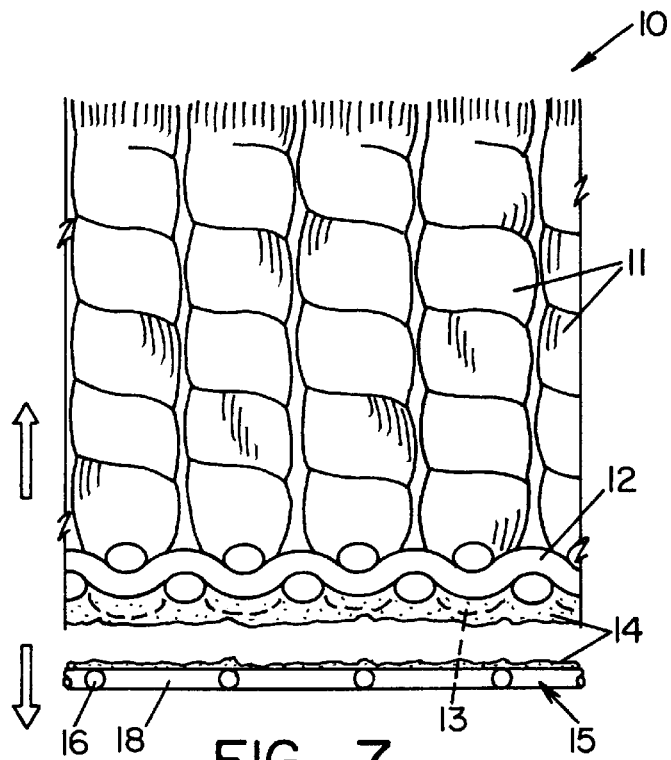
FIG. 7 is a view of a section of tufted carpet according to the prior art depicting the separation of the primary and secondary backing fabrics in delamination.
Figure 8:
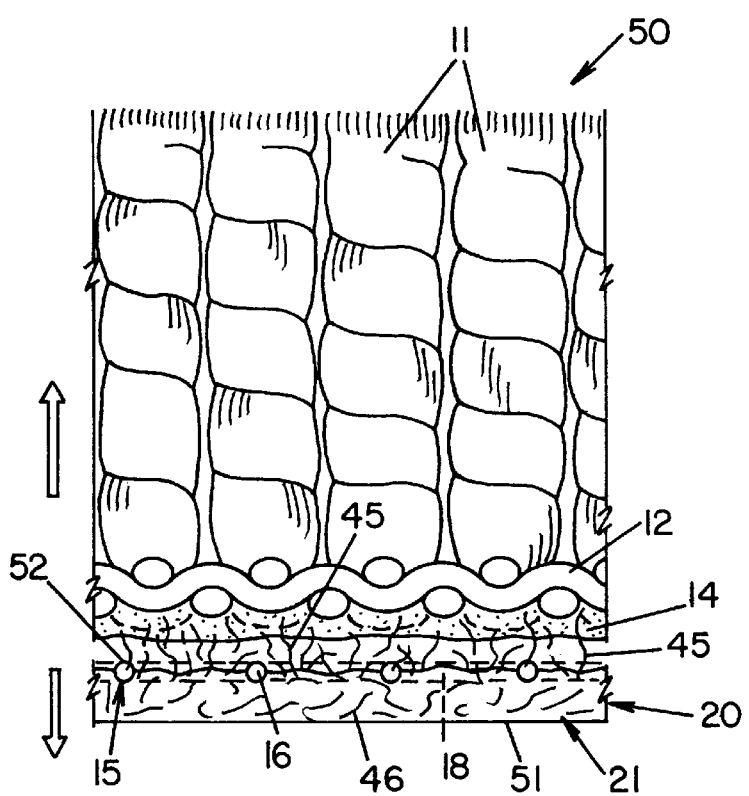
FIG. 8 is a view of a section of tufted carpet utilizing the modified secondary carpet backing scrim and depicting the separation of the primary and secondary backing fabrics in delamination.

FIG. 7 characterizes the prior art e. g. , the carpet 10, of FIG. 1. In FIG. 7, the secondary backing 15 is being pulled away from the primary backing 12 and after the cohesive value of the latex binder 14 has been exceeded, the two fabrics separate, in a manner indicative of delamination. FIG. 8 characterizes the present invention e. g. , the carpet 50, of FIG. 6, which utilizes a modified scrim. In FIG. 8, the modified scrim 20 is also being pulled away from the primary backing 12 and after the cohesive value of the latex binder 14 has been exceeded, the two fabrics separate, in a manner indicative of delamination. However, in stark distinction to the separation in FIG. 7, which appears "clean", the separation of scrim 20 from backing 12 is greatly impeded by the vast plurality of fibers 45 which have become entangled in the latex binder 14 as well as about the primary backing 12 to contact the loops 13 of the face yarns 11, which protrude through the primary backing 12.

Figure 9:
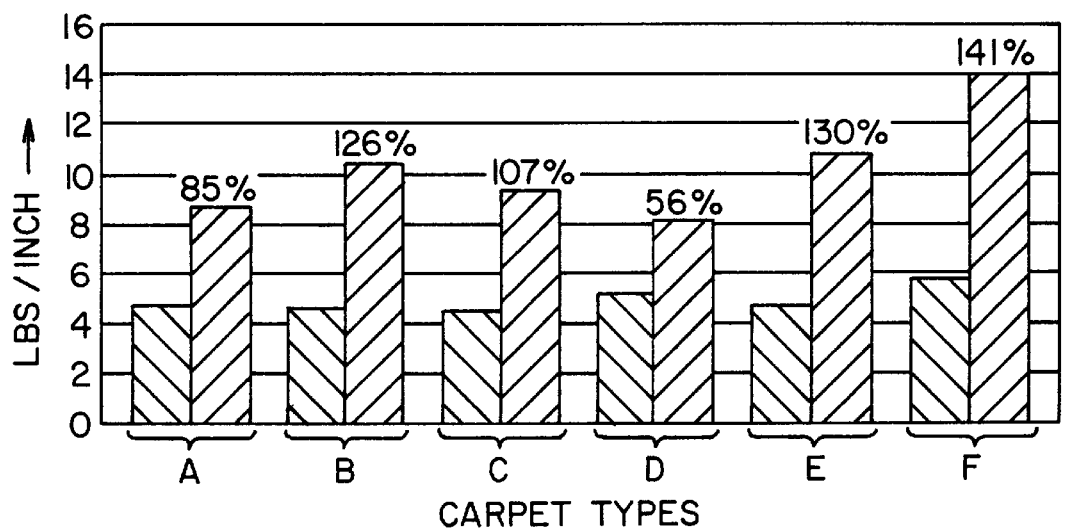
FIGS. 9–11 are bar graphs depicting delamination values and seam strengths comparing carpet according to the present invention with known carpet.

The result is a greater delamination strength. With reference to FIG. 9, it is evident that resistance to delamination was significantly improved in a variety of carpet types by the use of the modified scrim 20 of the present invention compared to carpet utilizing a conventional secondary scrim fabric 15. In FIG. 9, four loop pile carpets were evaluated— A=ClassicWeave; B=Hatteras II; C=Foothills; and D=Homeweave. Two cut pile Saxony type carpets were also evaluated—E=Versatile and F=Softmelody. Each carpet type A–F was provided in two forms; the bar on the left of each pair of values in FIG. 9 represents that carpet manufactured with a conventional secondary backing 15 while the bar on the right of each pair of values in FIG. 9 represents that carpet manufactured with a modified scrim 20 of the present invention. Delamination strengths of 2 to 3 times that of conventional carpet can be observed by comparing the values. For ready comparison, percentage increases have been noted above each of the right hand values. Delamination values were determined according to ASTM D-3936.

Figure 10:
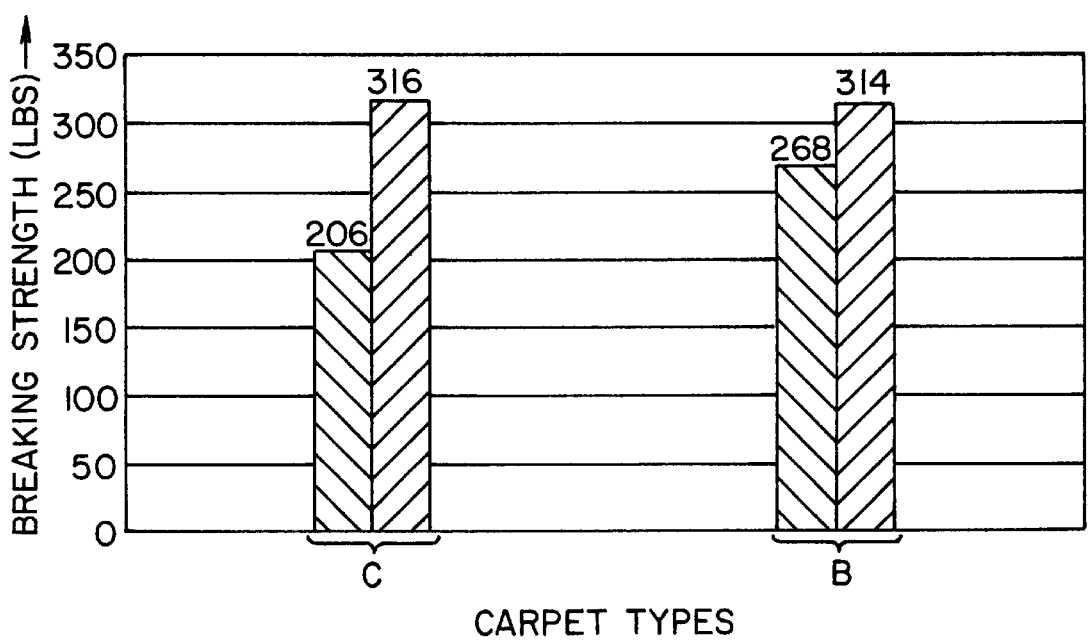
Figure 11:
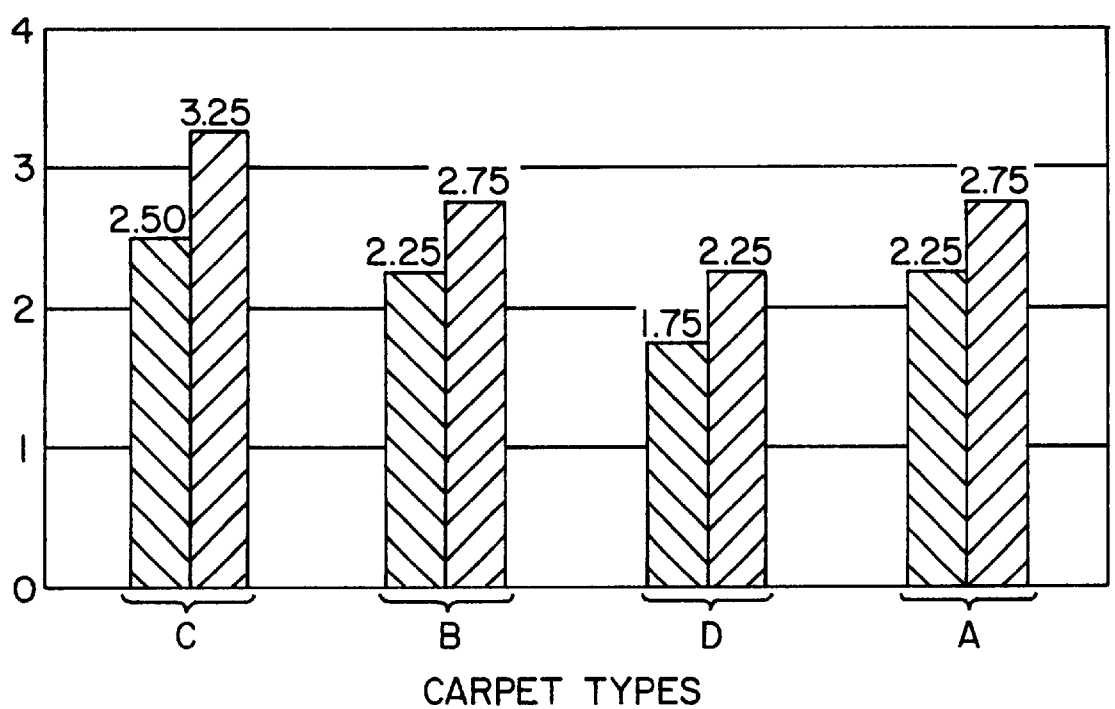

With reference to FIGS. 10 and 11, a noticeable increase in seam quality is also evident when the modified scrim 20 of the present invention is employed compared to carpet utilizing a conventional secondary backing fabric. In FIG. 10, seam pull breaking strength has been reported for carpets C (Foothills) and B (Hatteras II). Again, the bar to the left of each pair of values in FIG. 10 represents that carpet manufactured with a conventional secondary backing 15 while the bar on the right of each pair of values in FIG. 10 represents that carpet manufactured with a modified scrim 20 of the present invention. The seam pull strength was greatly enhanced due to the increase in total surface area provided by the modified scrim. This increase of over 50 percent in seam pull strength, provides for fewer product failures occasioned by poor adhesion quality of conventional backings as utilized in the current art. Seam pull breaking strength was determined according to ASTM D-2646.

Likewise, seam peaking is also improved as evident in FIG. 11. Carpet types C (Foothills), B (Hatteras II), D (Homeweave) and A (Classicweave) were evaluated, the prior art being depicted on the left bar of each pair and the invention being depicted on the right bar of each pair. As for interpreting the values reported in FIG. 11, seam peaking was rated on a scale of 0 to 4 with a value of 2 being indicative of an average or acceptable seam; 0 being poor and unacceptable; 1 being below average and 3 being above average. A difference of 0.5 is noticeable and carpet C (Foothills) showed a difference of 0.75. Generally, a seam rating of 3 provides a seam that cannot easily be seen. Considering the four ratings in FIG. 11, it is apparent that the carpet 50 provided better seams than conventional carpet 10.

As also noted hereinabove, the carpet 50 of the present invention provides a soft backing or face 51 opposite the face 52 provided by the scrim material 15. This soft backing forms a barrier uninterrupted by the scrim fabric 15 and subsequently blocks the migration of latex binders or adhesives containing abrasive filler which presently are exposed to the interior walls, wood trim, and all other interior surface in personal residences. Accordingly, unlike most carpet produced today, the carpet 50 does not present a rough underside surface but instead a smooth, soft surface to minimize surface damage to the walls, woodwork, baseboards, floors and other surfaces in homes and offices. Use of the modified secondary carpet backing also eases installation of carpet employing it by providing a surface with reduced friction, allowing both carpet and pad to slide together and improves the surface feel of "hand" of the finished carpet 50. The modified secondary carpet backing further functions to provide additional or sole padding to the carpet system.

The increased comfort under foot and value are both substantial and measurable as reported by a panel of test subjects when the carpet of the present invention is tested in comparison to carpet manufactured with conventional woven secondary backing. The comfort level of carpet according to the present invention was evaluated subjectively by a group of eight people, male and female adults. For this test, four carpeted areas approximately 8'×10' were laid out, each in eight separate panels as follows. First, two foot strips of urethane padding having different densities were laid onto a concrete floor surface. The first strip had a density of 1.8 pounds; the second strip had a density of 2.2 pounds; the third strip had a density of 2.7 pounds; and the fourth strip and had a density of 5.3 pounds. Each strip was approximately 10 feet long and the strips were arranged in contiguous rows. Over the top of the first five feet of padding strips, from the left side, was laid a panel of conventional carpet (10), Creative cutpile type, which covered all four strips (approximately eight feet in length). Immediately next to the first carpet segment was a second carpet segment (50), also Creative cutpile type, which covered all four strips, approximately eight feet in length. However, this panel was manufactured utilizing a modified scrim 20 according to the present invention. The result was a carpeted area providing eight different zones or cells.

Figure 12A:
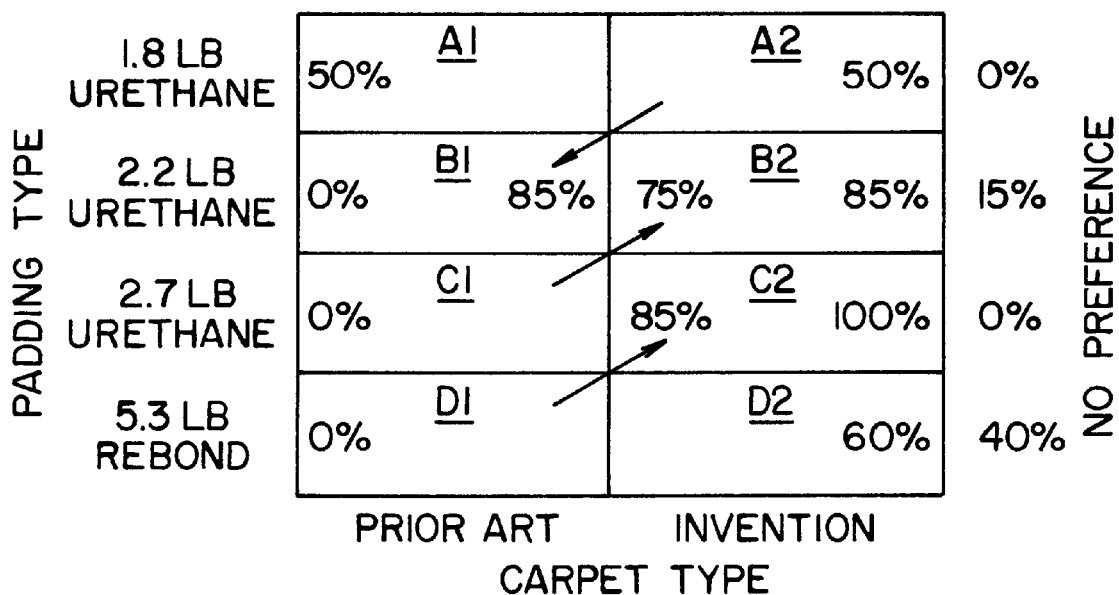
FIGS. 12A–B are two comparison areas upon which one type of carpet was evaluated for comfort, each of which reports statistical results of the evaluations.
Figure 12B:
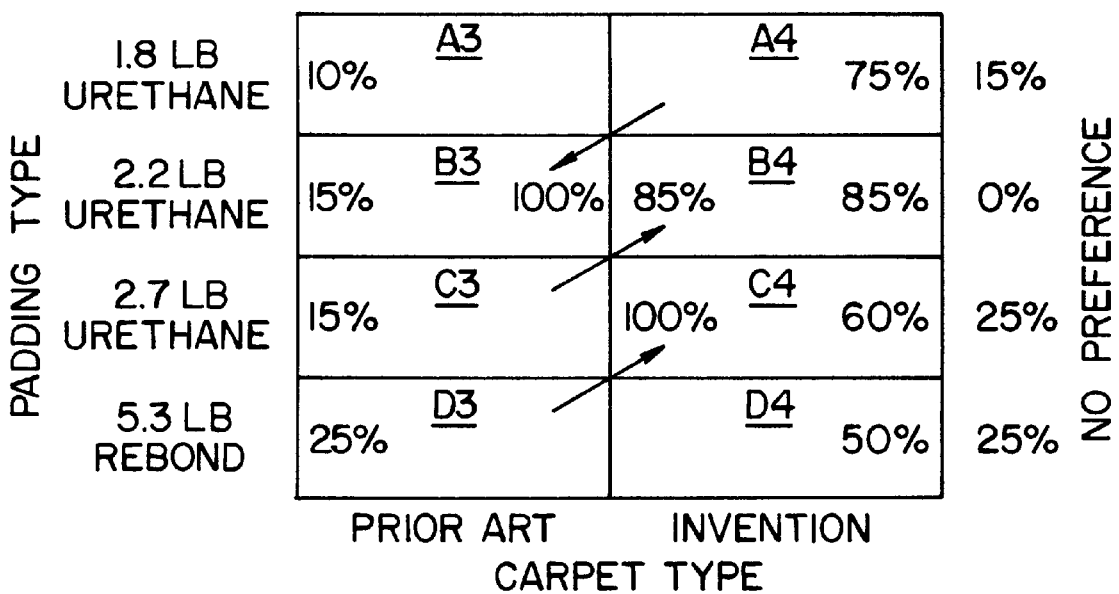

With respect to the remaining drawing figures, the results of these evaluations have been depicted schematically. In FIGS. 12A and 12B Creative cutpile carpet was reported and in FIG. 12A, the subjects wore shoes onto the carpet while in FIG. 12B, the subjects removed their shoes. Referring first to FIG. 12A, eight cells have been labelled: A1–A2; B1–B2; C1–C2 and D1–D2. The left hand side (1) of each pair of cells was for the prior art carpet 10,while the immediate right hand side (2) of each pair of cells was for the carpet 50 ,according to the present invention.

Each of the subjects walked onto cell A1 to develop a "feel" and they then proceeded to cell A2 and did the same. From cell A2,each proceeded to cell 81,then cell B2,then C1 and so forth. The results of such testing have been recorded in each cell for ready comparison. For example, 50% of the subjects felt that cell A1 was more comfortable than cell A2 and an equal 50% were favorably disposed to cell A2. When moving from cell A2 directly to cell B1 (prior art carpet over thicker padding) 85% of the subjects reported a better feel than over cell A2. Nevertheless, when comparing cell B1 directly with cell B2, 85% of the subjects preferred cell B2, 15% of the subjects expressing no preference.

Next, and totally unexpectedly, after movement between cell B2 (carpet 50 ) to cell C1 (carpet 10), 75% of the subjects reported they preferred cell B2 over cell C1. In other words, travelling to a thicker padded carpet did not represent an improvement in feel to a majority of the subjects. At this point it can be noted that the arrow between cells B1 and A2 points toward cell B1, revealing that preference at 85%, while the arrow between cells C1 and B2 points toward cell B2, revealing that preference at 75% and so forth. Following this scheme, it can be seen that in the last comparisons, cell C2 was preferred over cell D1 by 85% and cell D2 was preferred over cell D1 by 60%.

In FIG. 12B, the same interpretation results can be applied for subjects walking onto the same carpets as reported for FIG. 12A, but with shoes removed. Again the preferences have been reported for each cell and the trends between adjacent cells ran, B3 preferred over A4, but then B4 preferred over C3 and C4 preferred over D3. In other words, moving up a step in padding level for the carpet 10 did not as often provide a better feel over the lower level of padding for the carpet 50 in the majority of instances.

Figure 13A:
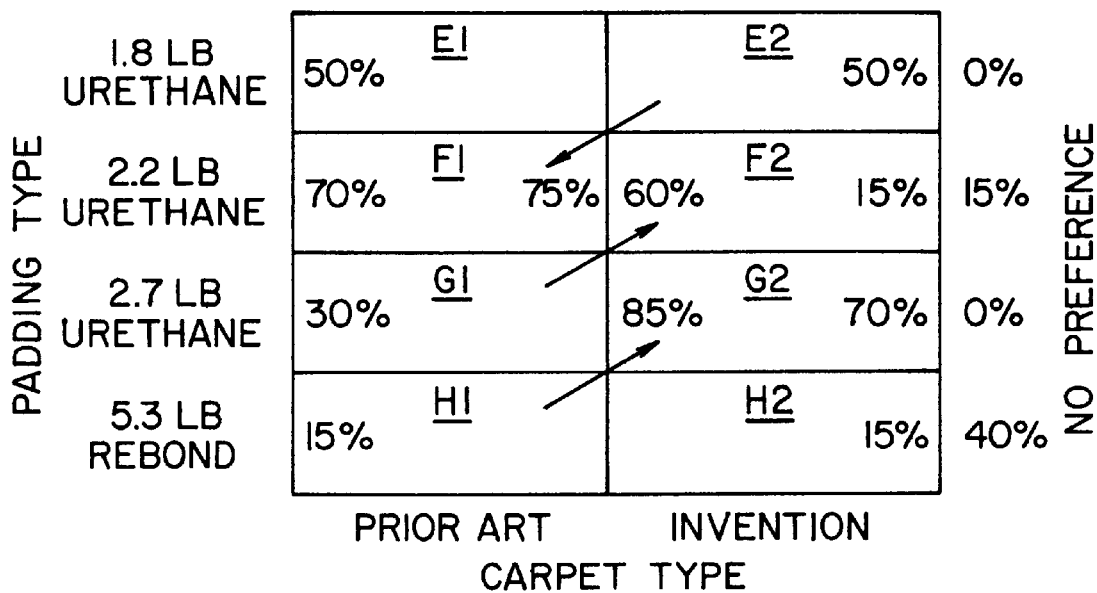
FIGS. 13A–B are two additional comparison areas upon which another type of carpet was evaluated for comfort, each of which reports statistical results of the evaluations.
Figure 13B:
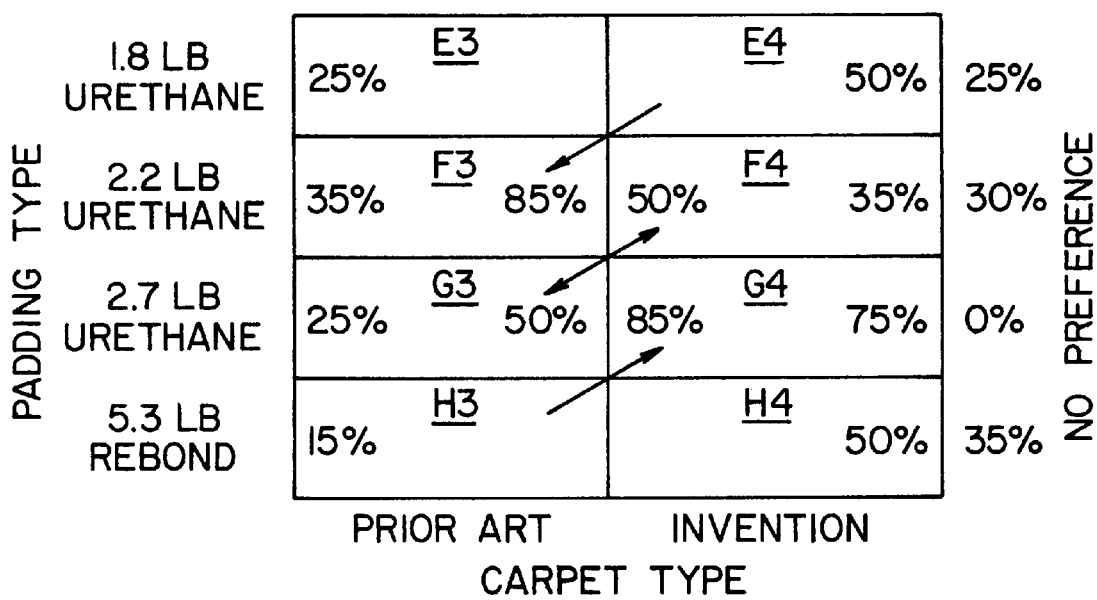

Next, in FIGS. 13 A and B, the same type of carpeted areas were tested and reported but in these pairs of tests, a Homeweave Berber carpet was employed. In FIG. 13 A, cells E1, F1, G1 and H1 were conventional carpet 10 and cells E2, F2, G2 and H2 were the carpet 50 of the present invention where the subjects wore their shoes. In FIG. 13B cells E3, F3, G3 and H3 were conventional carpet 10 and cells E4, F4, G4 and H4 were the carpet 50 of the present invention where the subjects first removed their shoes. Statistical results and trends have been recorded in these figures as described hereinabove.

Based on the combined results, two conclusions can be drawn. First, the use of the modified scrim imparts a better feel to the carpet 50 and can allow it to be utilized with a lower grade of padding in most instances, excepting the very least grade of padding and even there, for the same grade of padding, the carpet 50 generally fared better than the carpet 10. Second, the modified scrim 20 is not sensitive to any particular type of carpet for imparting the improvements proclaimed herein.

Thus, it should be evident that the carpet of the present invention is provided with a soft backing surface even though retaining the otherwise conventional assemblage of components i. e. , primary and secondary backing materials and latex binder or adhesive. In other words, it is to be understood that practice of the present invention includes the use of all known face yarns, primary and secondary backing members and fiber batts or nonwoven fabrics with the secondary backing. Fibrous components can be derived from synthetic as well as natural fibers and synthetic materials can be derived from virgin as well as recycled materials. The soft backing is obtained through use of the modified secondary scrim of the present invention which provides a fiber batt integrated with the secondary backing fabric. The modified fabric or scrim, in turn, provides a soft face opposite the face presented by the scrim or secondary fabric, which is uninterrupted by the scrim fabric and, within the carpet, it provides a barrier to the flow of the latex binder or adhesive.

The carpet is particularly suited for use in residential applications as well as commercial or anywhere that walls or woodwork would be damaged by contact with the carpet backing during delivery and installation. Moreover, it will be appreciated that the carpet of the present invention can be manufactured with equipment and methods other than what is detailed hereinabove, it being understood that the equipment and methods for producing the modified scrim has been provided for purposes of demonstration only.

In addition, while the present invention has been described in conjunction with the use of a single modified scrim layer or component, it is not beyond the scope of the present invention to provide more than one such modified scrim layer within the carpet product, where a further increase in the improved properties are desired. Moreover, while the modified scrim has been described in conjunction with the use as a component of carpet, it is also envisioned that such scrim material may have other uses such as separate carpet padding.

Based upon the foregoing disclosure, it should now be apparent that the modified scrim and carpet described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the methods of manufacture of the face yarns, primary backing fabric and secondary backing fabric employed in the manufacture of carpet do not constitute any limitation on practice of the present invention. Additionally, as noted hereinabove, other means for joining the nonwoven layer, or fiber batt, to the secondary backing fabric and other means for treating the nonwoven side of the modified scrim can be substituted for the needlepunching and infrared heating steps. Thus, the scope of the invention shall include all modifications and variations that may fall within the scope of the attached claims.

What is claimed is:

1. A carpet comprising:
   a face yarn;
   a woven primary backing fabric, of closed weave construction said face yarn being tufted into said primary backing fabric;
   a modified secondary backing fabric attached to said woven primary backing fabric;
   an adhesive material binding said face yarn to said woven primary backing fabric and said woven primary backing fabric to said modified secondary backing fabric;
   said modified secondary backing fabric comprising a first fabric of open weave construction having first and second faces, said first fabric comprising a leno weave of about 16 ends per inch warp direction by about 5 picks per inch weft direction;
   and a non-woven fiber batt having a weight ranging from about 0.5 to about 40 ounces per square yard and attached to and entangled with said first fabric, covering said first face and penetrating said second face sufficiently to integrate said first fabric and said fiber batt while maintaining said second face, thereby enhancing the structural integrity of said first fabric providing a soft surface forming the underside surface of said carpet and blocking exudation of any of said adhesive material from the underside of said carpet.

2. A carpet, as set forth in claim 1, wherein said face yarn is selected from the group consisting of polyolefins, polyamides, polyesters, polyethylene terephthalate (PET) and polytrimethylene terephthalate (PTT), natural fibers and mixtures thereof.

3. A carpet, as set forth in claim 1, wherein said primary backing fabric is selected from the group consisting of polyolefins, polyamides, natural fibers and mixtures thereof.

4. A carpet, as set forth in claim 3, wherein said primary backing fabric comprises polypropylene fibers.

5. A carpet, as set forth in claim 1, wherein said first fabric is selected from the group consisting of polyolefins, polyamides, natural fibers and mixtures thereof.

6. A carpet, as set forth in claim 5, wherein said first fabric comprises polypropylene fibers.

7. A carpet, as set forth in claim 1, wherein said fiber batt is a carded web, crosslaid fabric.

8. A carpet, as set forth in claim 7, wherein said fiber batt employs 4 denier×4 inch fibers.

9. A carpet, as set forth in claim 1, wherein said non-woven fiber batt is manufactured from fibers having anti-microbial properties.

10. A carpet, as set forth in claim 1, wherein said non-woven fiber batt is manufactured from fibers having anti-static properties.

11. A carpet, as set forth in claim 1, wherein said adhesive material is selected from the group consisting of styrene-butadiene rubbers, PVC, EVA, polyesters, polyurethanes, polyolefins, emulsified polymers and mixtures thereof.

12. A carpet produced by the process of:
    tufting a face yarn to a woven primary backing fabric of closed weave construction;
    providing a modified secondary backing fabric; and
    binding said face yarn to said primary woven backing fabric and said woven primary backing fabric to said secondary backing fabric with an adhesive material;
    wherein said step of providing said modified secondary backing fabric includes
      selecting a non-woven fiber batt having a weight ranging from about 0.5 to about 40 ounces per square yard and a first fabric of open weave construction having first and second opposed faces, said first fabric comprising a leno weave of about 16 ends per inch warp direction by about 5 picks per inch weft direction;
      attaching said non-woven batt and said first fabric by entangling, covering said first face and penetrating said second face sufficiently to integrate said first fabric and said fiber batt while maintaining said second face; thereby enhancing the structural integrity of said first fabric providing a soft surface, forming the underside surface of said carpet and blocking exudation of any of said adhesive material from the underside of said carpet.

13. A carpet, as set forth in claim 12, wherein said face yarn is selected from the group consisting of polyolefins, polyamides, polyesters, polyethylene terephthalate (PET) and polytrimethylene terephthalate (PTT), natural fibers and mixtures thereof.

14. A carpet, as set forth in claim 13, wherein said primary backing fabric is selected from the group consisting of polyolefins, polyamides, natural fibers and mixtures thereof.

15. A carpet, as set forth in claim 14, wherein said primary backing fabric comprises polypropylene fibers.

16. A carpet, as set forth in claim 12, wherein said first fabric is selected from the group consisting of polyolefins, polyamides, natural fibers and mixtures thereof.

17. A carpet, as set forth in claim 16, wherein said first fabric comprises polypropylene fibers.

18. A carpet, as set forth in claim 12, wherein said fiber batt is a carded web, crosslaid fabric.

19. A carpet, as set forth in claim 18, wherein said fiber batt employs 4 denier×4 inch fibers.

20. A carpet, as set forth in claim 19, wherein said fiber batt has a fabric weight of from about 1.5 to about 6 ounces per square yard.

21. A carpet, as set forth in claim 12, wherein said adhesive material is selected from the group consisting of styrene-butadiene rubbers, PVC, EVA, polyesters, polyurethanes, polyolefins, emulsified polymers and mixtures thereof.

* * * * *

UNITED STATES PATENT AND TRADEMARK OFFICE
CERTIFICATE OF CORRECTION

PATENT NO.    : 6,344,254 B1                                    Page 1 of 1
DATED         : February 5, 2002
INVENTOR(S)   : Gregory B. Smith and Gregory D. Fowler It is certified that error appears in the above-identified patent and that said Letters Patent is hereby corrected as shown below:

<u>Column 19,</u>
Line 37, the word "yam" should be -- yarn --; and

<u>Column 20,</u>
Lines 17 and 20, the word "yam" should be -- yarn --.

Signed and Sealed this

Twenty-eighth Day of May, 2002

Attest:

Attesting Officer

JAMES E. ROGAN
*Director of the United States Patent and Trademark Office*